United States Patent
Le Roux et al.

(10) Patent No.: US 10,270,549 B2
(45) Date of Patent: Apr. 23, 2019

(54) METHOD OF AUDIO/VIDEO BROADCAST PLAY OUT HANDOVER AND CORRESPONDING APPARATUS

(71) Applicant: INTERDIGITAL CE PATENT HOLDINGS, Paris (FR)

(72) Inventors: Yannick Le Roux, Betton (FR);
Frederic Poupard, Val d'ize (FR);
Hamid Boussaad, Le Meziere (FR);
Mathieu Georges, Saint Marcan (FR)

(73) Assignee: INTERDIGITAL CE PATENT HOLDINGS, Paris (FR)

( * ) Notice: Subject to any disclaimer, the term of this patent is extended or adjusted under 35 U.S.C. 154(b) by 0 days.

(21) Appl. No.: 15/523,412

(22) PCT Filed: Oct. 28, 2015

(86) PCT No.: PCT/EP2015/074929
§ 371 (c)(1),
(2) Date: May 1, 2017

(87) PCT Pub. No.: WO2016/071169
PCT Pub. Date: May 12, 2016

(65) Prior Publication Data
US 2017/0310407 A1 Oct. 26, 2017

(30) Foreign Application Priority Data
Nov. 6, 2014 (EP) ..................................... 14306773

(51) Int. Cl.
*H04H 20/40* (2008.01)
*H04H 20/08* (2008.01)
(Continued)

(52) U.S. Cl.
CPC ............ *H04H 20/08* (2013.01); *H04H 20/40* (2013.01); *H04H 60/43* (2013.01); *H04H 60/65* (2013.01);
(Continued)

(58) Field of Classification Search
CPC ........ H04H 20/02; H04H 20/04; H04H 20/06; H04H 20/08; H04H 20/40; H04H 20/42; H04H 20/423
See application file for complete search history.

(56) References Cited

U.S. PATENT DOCUMENTS 7,725,102 B2 5/2010 Engstrom et al.
2005/0252959 A1* 11/2005 Gaumond ........ H04N 21/41407
235/375

(Continued)

FOREIGN PATENT DOCUMENTS

CN 102857264 1/2013
CN 102939589 2/2013
(Continued)

OTHER PUBLICATIONS

King, "Tip: Spotify Canned Lets You Stream Music to Your Other Android Devices, Not Just Internet-Enabled Speakers", http://andoidpolice.com, May 19, 2014, pp. 1-5.
(Continued)

*Primary Examiner* — Dong-Chang Shiue
(74) *Attorney, Agent, or Firm* — Jeffrey M. Navon

(57) ABSTRACT

Handover of broadcast audio/video content from a first/source device via an intermediate device to a second/destination device. The intermediate device is set up to receive by its own means the same broadcast audio/video content as received by the first/source device. If interruption of play out of the audio/video content by the first/source device is detected by the intermediate device, the interme-
(Continued)

diate device stores the received audio/video broadcast in timeshift memory. When a presence of the second/destination is detected, the intermediate device connects to the second/destination device and starts timeshifted streaming to the second/destination device.

15 Claims, 6 Drawing Sheets

(51) Int. Cl.
    *H04H 60/43*    (2008.01)
    *H04H 60/65*    (2008.01)
    *H04N 21/414*   (2011.01)
    *H04N 21/436*   (2011.01)
    *H04N 21/4367*  (2011.01)
    *H04N 21/442*   (2011.01)

(52) U.S. Cl.
    CPC ... *H04N 21/41422* (2013.01); *H04N 21/4367* (2013.01); *H04N 21/43615* (2013.01); *H04N 21/44227* (2013.01); *H04H 2201/90* (2013.01)

(56) References Cited

U.S. PATENT DOCUMENTS

| | | |
|---|---|---|
| 2007/0061725 A1 | 3/2007 | Isaac et al. |
| 2009/0298484 A1* | 12/2009 | White .................... H04H 20/24 455/414.3 |
| 2011/0252442 A1 | 10/2011 | Cui et al. |
| 2011/0275358 A1* | 11/2011 | Faenger ................ G06F 9/4856 455/420 |
| 2013/0005258 A1 | 1/2013 | Uefuji et al. |
| 2013/0044885 A1 | 2/2013 | Master et al. |
| 2014/0179327 A1* | 6/2014 | Uwamori ................ H04B 3/36 455/450 |
| 2014/0200694 A1 | 7/2014 | Kennedy |
| 2014/0237518 A1 | 8/2014 | Liu |
| 2015/0215382 A1* | 7/2015 | Arora ................ H04N 21/4126 382/118 |
| 2016/0077710 A1* | 3/2016 | Lewis ................ G06F 3/04842 715/716 |

FOREIGN PATENT DOCUMENTS

| | | |
|---|---|---|
| CN | 103823655 | 5/2014 |
| GB | 2483092 | 2/2012 |
| KR | 2010046945 | 5/2010 |
| WO | WO2005111853 | 11/2005 |
| WO | WO2011139963 | 11/2011 |

OTHER PUBLICATIONS

Anonymous, "Spotify Connect: the new way to play at home", http://www.news.spotify.com, May 19, 2014, pp. 1-3.

D'Orazio, "Spotify Connect lets you control and play music from any device", http://www.theverge.com, Sep. 3, 2013, pp. 1-9.

* cited by examiner

METHOD OF AUDIO/VIDEO BROADCAST
PLAY OUT HANDOVER AND
CORRESPONDING APPARATUS

This application claims the benefit, under 35 U.S.C. § 365 of International Application PCT/EP2015/074929, filed 28 Oct. 2015, which was published in accordance with PCT Article 21(2) on 12 May 2016 under number WO2016/071169, in English, and which claims the benefit of European patent application No. 14306773.4, filed 6 Nov. 2014.

1. TECHNICAL FIELD

The present disclosure generally relates to handover of audio/video content.

2. TECHNICAL BACKGROUND

Many car drivers listen to music or information broadcast programs on their car radio while on their way home. When the music or the information broadcast program is not yet finished when the driver arrives at her/his premises and she/he wishes to continue listening to the program, the only option is to stay in the car and wait for the music or the information program to end. Patent application US2014/0200694A1 with primary inventor Kennedy describes a radio capture method wherein a computing device may assist users in resuming listening to their radio programs. A record request may be generated in response to the user arriving at their destination, and the user may resume listening using the computing device. Among some of the disadvantages of this prior art is that it requires a network infrastructure with distant recording servers, is therefore not easy to implement nor easily scalable. Furthermore, manual intervention of the user is required.

It would therefore be desirable to have a device and method for handover that does not require an additional network infrastructure, is scalable and does not require manual user intervention. There is thus a need for further improvement of prior art solutions.

3. SUMMARY

The present disclosure aims at alleviating some of the inconveniences of prior art.

To this end, the present principles comprise a method of seamless play out handover from a first device to a second device of an audio/video broadcast. The method is implemented by an intermediate device and comprises: setting up, by the intermediate device, a reception of the audio/video broadcast played out by the first device; detecting, by the intermediate device, an interruption of play out by the first device of the audio/video broadcast and storing in a timeshift memory of the intermediate device the audio/video broadcast received by the intermediate device; connecting the intermediate device to the second device if a presence of the second device is detected by the intermediate device, and timeshifted streaming by the intermediate device of the audio/video broadcast received by the intermediate device to the second device from the timeshift memory of the intermediate device for seamless play out handover of the audio/video broadcast from the first device to the second device.

According to a variant embodiment, the method comprises, when a timeshift delay of the timeshifted streaming of the audio/video broadcast is below a threshold: transmitting, by the intermediate device, a request to the second device to switch to reception by the second device of the audio/video broadcast through a receiver arrangement for receiving the audio/video broadcast comprised into the second device or associated to the second device; and freeing by the intermediate device of resources of the intermediate device used for reception and storing of the audio/video broadcast when a confirmation is received by the intermediate device from the second device that the second device has switched to reception of the audio/video broadcast through the receiver arrangement of the second device.

According to a variant embodiment, the detecting the interruption of play out is based on a measurement by the intermediate device of a level of at least one physical parameter generated by the first device dropping below a threshold.

According to a variant embodiment, the at least one physical parameter generated by the first device is a signal level of a radio frequency signal generated by the first device.

According to a variant embodiment, the at least one physical parameter generated by the first device is an audio level of play out by the first device of the audio/video broadcast.

According to a variant embodiment, the presence of the second device is detected based on a distance detection, the presence of the second device being detected when a distance between the intermediate device and the second device is below a threshold.

According to a variant embodiment, the presence of the second device is detected through Near Field Communication.

According to a variant embodiment, the presence of the second device is detected based on a detection of a wireless digital communication network comprising the second device.

According to a variant embodiment, the presence of the second device is detected based on a physical detection by the intermediate device of a presence of the second device.

According to a variant embodiment, the physical detection comprises use of a camera in the intermediate device to capture an image of the second device.

According to a variant embodiment, the physical detection comprises use of a pointing arrangement to determine a pointing of the intermediate device to the second device.

The present principles also comprise an apparatus for seamless play out handover from a first device to a second device of an audio/video broadcast, comprising: a receiver configured to receive the audio/video broadcast played out by the first device; a detector configured to detect an interruption of play out by the first device of the audio/video broadcast, and a timeshift memory, configured to store the audio/video broadcast received by the receiver upon the detection; and a network interface configured to connect the apparatus to the second device if a presence of the second device is detected and a processor configured for timeshifted streaming of the audio/video broadcast received by the receiver to the second device from the timeshift memory for seamless play out handover of the audio/video broadcast from the first device to the second device.

According to a variant embodiment of the device, the network interface is further configured to transmit a request to the second device to switch to reception by the second device of the audio/video broadcast through a receiver arrangement for receiving the audio/video broadcast comprised into the second device or associated to the second device, when a timeshift delay of the timeshifted streaming of the audio/video broadcast is below a threshold; and the processor is further configured to free the receiver and the timeshift memory when a confirmation is received by the apparatus from the second device that the second device has switched to reception of the audio/video broadcast through the receiver arrangement of the second device.

According to a variant embodiment of the device, the detector is further configured to detect an interruption of play out by the first device by measuring a level of at least one physical parameter generated by the first device.

According to a variant embodiment of the device, the detector is further configured to detect an interruption of play out by the first device by measuring a signal level of a radio frequency signal generated by the first device.

4. LIST OF FIGURES

More advantages of the present principles will appear through the description of particular, non-restricting embodiments of the disclosure. In order to describe the manner in which the advantages of the present principles can be obtained, particular descriptions of the present principles are rendered by reference to specific embodiments thereof which are illustrated in the appended drawings. The drawings depict exemplary embodiments of the disclosure and are therefore not to be considered as limiting its scope. The embodiments described can be combined to form particular advantageous embodiments. In the following figures, items with same reference numbers as items already described in a previous figure will not be described again to avoid unnecessary obscuring the disclosure.

The exemplary embodiments will be described with reference to the following figures.

5. DETAILED DESCRIPTION

Figure 1:
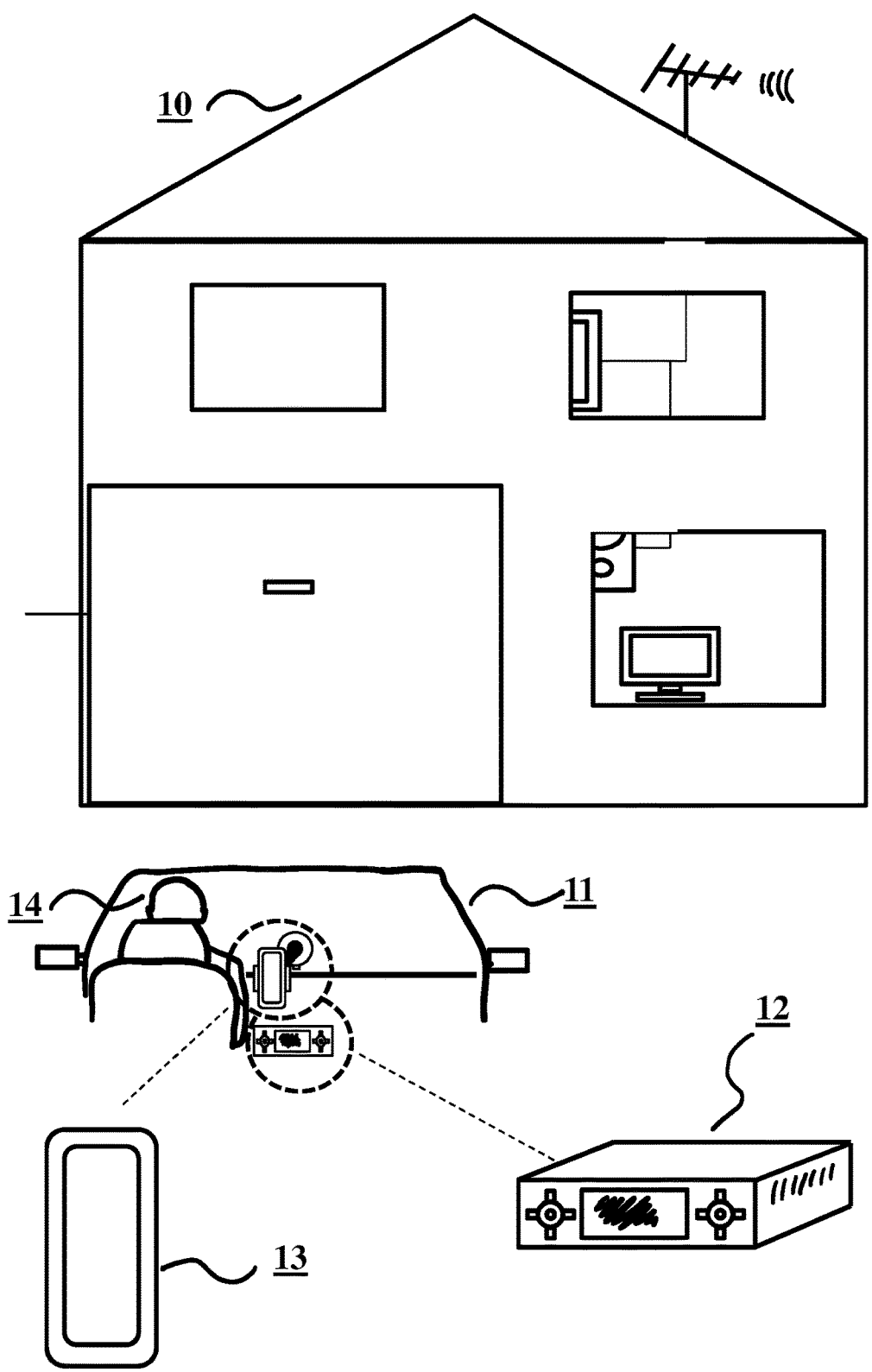
FIG. 1 is a diagram illustrating the context of the present principles of play out handover.

FIG. 1 illustrates a context of application of the present principles. Depicted are: a home 10, a car 11 with a driver 14, a smartphone 13 and a car radio 12. The driver is listening to a radio program when arriving at home. However, the radio program is not finished and the driver wishes to continue listening to the radio program in the home.

Figure 2:
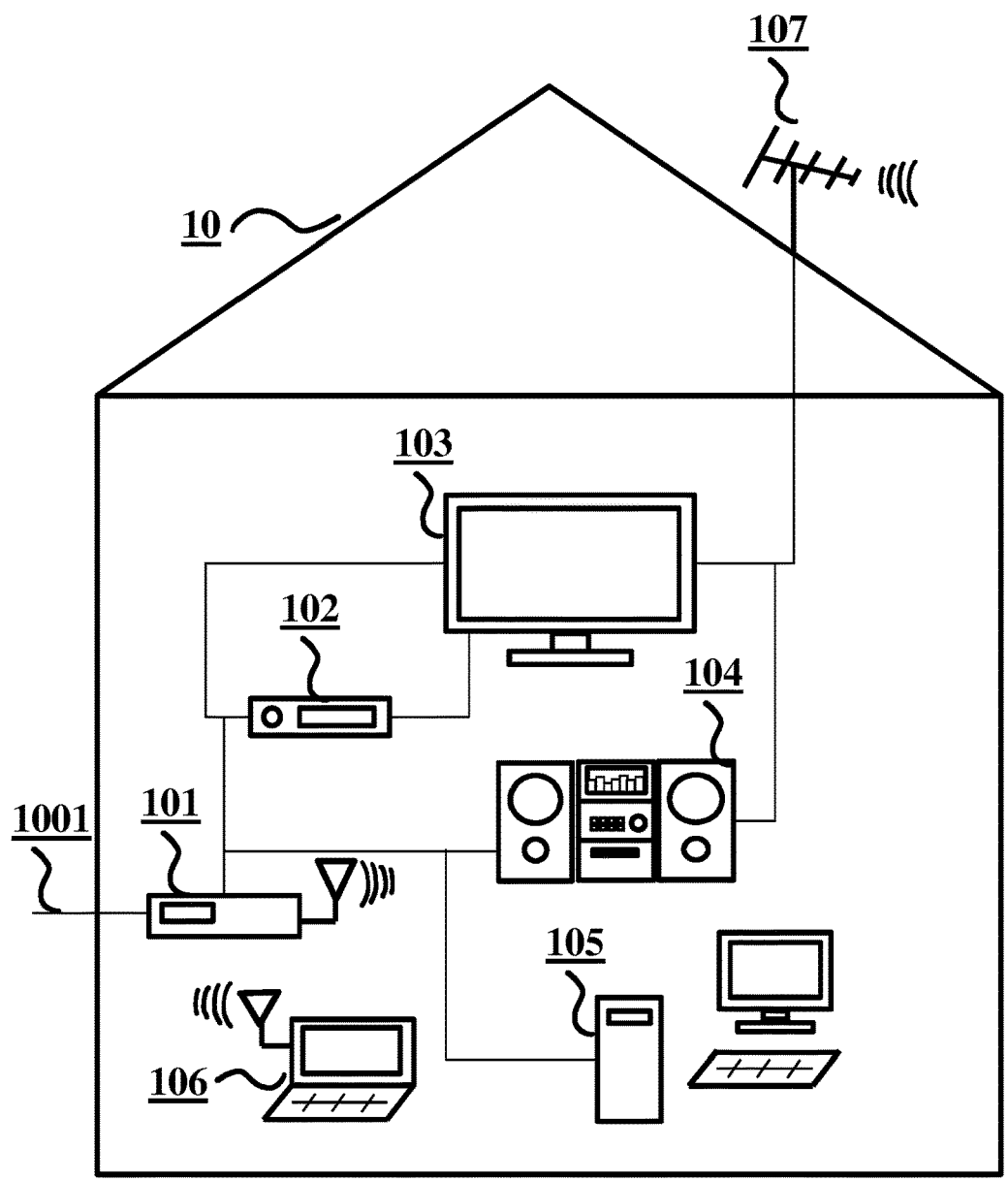
FIG. 2 is diagram illustrating a typical home with a home network for play out handover according to the present principles.

FIG. 2 is diagram illustrating a typical home 10 with a home network for play out handover according to the present principles. The home network comprises: a gateway device 101, equipped with wired and wireless data communication interfaces; a digital set top box 102, a digital television 103, a hifi set 104, a desktop personal computer (PC) 105, a notebook PC 106 with wireless interface, an external antenna 107 and a connection to an external digital communication network 1001, e.g. the Internet. The digital television 103 can receive content from the external antenna 107, from the digital set top box 102, from the gateway device 101 or from any of the PCs 105, 106. The digital set top box 102 can receive content from the gateway device 101. The hifi set 104 can receive content from the gateway device 101, from the desktop PC 105, from the notebook PC 106 or from the external antenna 107. The desktop PC 105 can receive content from any of the devices 101-102, 104 and 106. The notebook PC 106 can receive content from any of the devices 101-102, 104 and 105.

Figure 3:
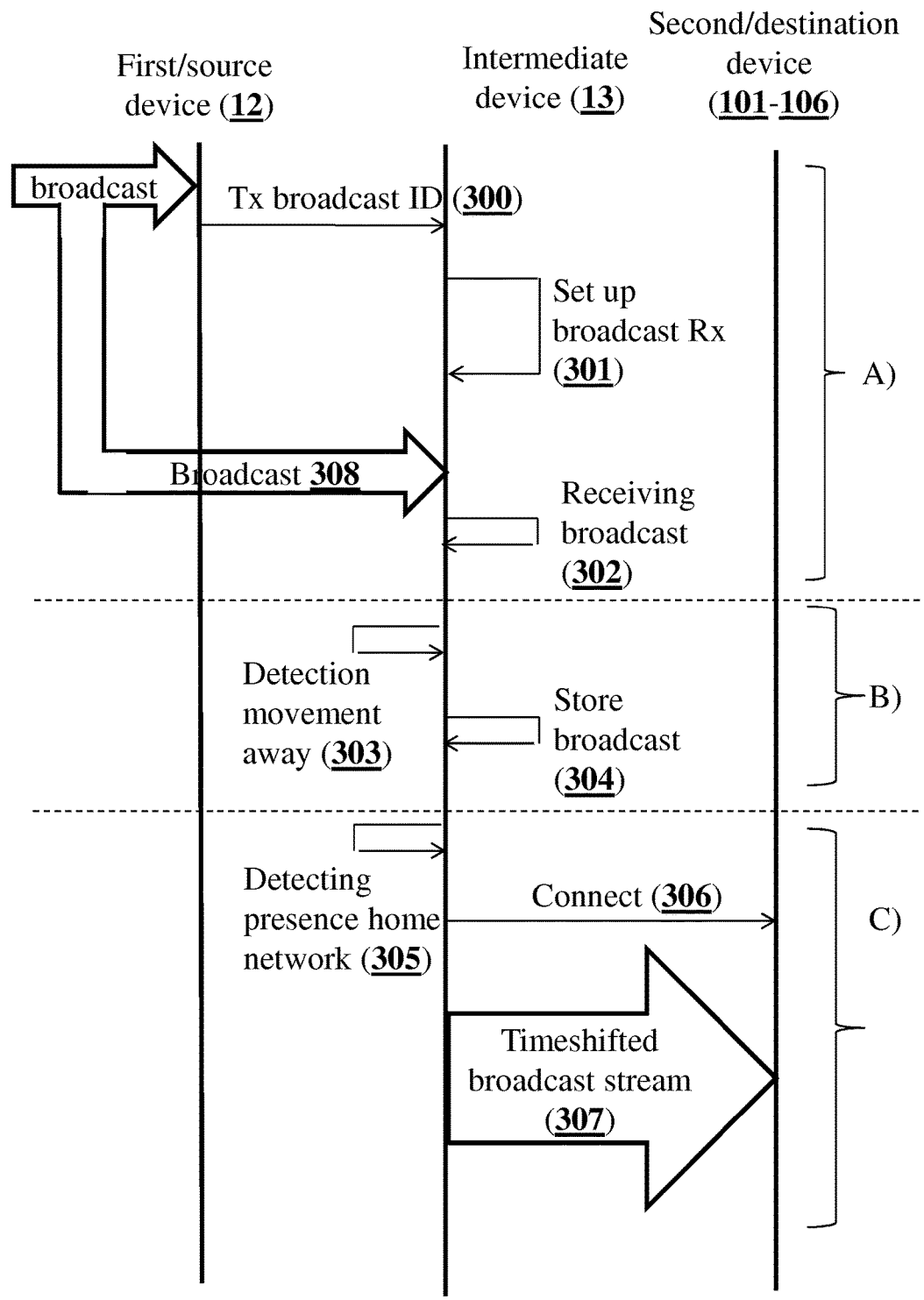
FIG. 3 is a sequence chart of an example embodiment of aspects of the present principles.

FIG. 3 is a sequence chart of an example embodiment of aspects of the present principles. The vertical lines represent, from left to right, a first/source device (or source device) 12 for the handover, here a car radio, an intermediate device 13, here a smartphone, and a second device (or destination device) 101-106, here a home network device. The communication exchanges between the devices are represented horizontally. The wording 'first' or 'source'; 'intermediate'; 'second' or 'destination' device; refer to a handover according to the present principles e.g. from the first/source device via the intermediate device to the second/destination device.

Though the following example embodiment involves a car and home environment, the present principles equally apply to other types of environments such as: office, movie production studio for handover of audio/video content from one workplace to another, car-to-car, car-to-home, home-to-car home-to-office, home-to-home for environment to environment handover. Though the following example embodiment involves a car radio as a first/source device, a smartphone as an intermediate device and a home network device as a second/destination device, the present principles can be equally applied to other types of devices. Example devices that can be any of the first/source and second/destination device comprise any device that can receive broadcast content, such as an (Internet) radio/TV receiver, a smartphone, a television set, a personal computer, netbook or tablet. Example intermediate devices according to the present principles are: a smartphone, a dedicated device particularly designed to implement the current principles, wearable technology such as Google Glass. The broadcasted content can be broadcasted by any means such as analog broadcasting or digital streaming. Although the following example embodiment is described for handover of a broadcast audio content such as radio broadcast, the present principles are also applicable to handover of broadcast video content such as television broadcast. The generic term broadcast audio/video content means broadcast audio or video content alone or broadcast audio and video content. While according to the following example embodiment the second/destination device is located in a home network, the present principles are applicable without presence of a home network.

The scenario depicted follows a sequence A, B, C:

A) a user having an intermediate device 13, is in his/her car and listens to a broadcast radio station when he/she drives home. References 300-302 and 308.

B) the user leaves the car while wearing/holding the intermediate device. Listening is interrupted. References 303-304.

C) the user continues listening to the broadcast radio station which listening was interrupted when he/she left his/her car. References 305-307.

Each of the above points in the sequence is further explained in the following paragraphs.

A: User, in Car, Having Intermediate Device, Listens to Broadcast Radio

When the user is in his car he/she receives (broad arrow) a broadcast radio station to which he/she listens. The car radio communicates with the smartphone, e.g. via WiFi, Bluetooth® or NFC, and transmits 300 the identifier of the tuned-to broadcast channel or radio station to the smartphone. The identifier is for example such as embedded in RDS (Radio Data System) or RDBS (Radio Broadcast Data System) for radio transmissions, or read from Service Information (SI; e.g. DVB-SI, for Digital Video Broadcasting-Service Information) for television transmissions.

According to a variant embodiment, in order to determine the radio station identifier of the radio tuned to by the car radio, there is no communication link between the car radio and the smartphone that is used for determining of the radio station identifier, however the smartphone captures the sound of the car radio and determines the tuned-to radio station, e.g. by tuning with its receiver to different radio stations and comparing the audio signal produced by the car radio with that of the radio station that is tuned to by the smartphone until a radio station is found of which the audio signature corresponds. This variant embodiment may take into account any lag between the audio signals that is due to different transmission and/or processing delays. This variant is also applicable for television programs where audio signals of accompanying audio channels are compared.

The receiver in the intermediate device 13 can be any type of receiver such as a radio broadcast receiver that has a tuner for receiving radio waves, an Internet receiver capable of connecting to an URL (Unified Resource Locator) for receiving Internet radio, or a 3G/4G/LTE (Long Term Evolution) receiver.

According to a variant embodiment, the intermediate device 13 captures the station name that is shown on the display of the car radio via a built-in camera and applies OCR (Optical Character Reading) to retrieve a textual version of the radio station identifier.

According to a further variant embodiment, the identification of the radio station or television channel is done by reading of a displayed QR (Quick Response) code or channel logo.

Following the identification of the broadcast station, the intermediate device in turn sets up 301 a reception of the identified broadcast radio station, using its own receiver arrangement (e.g. a radio wave receiver or an Internet receiver comprised in the intermediate device).

According to a variant embodiment, the reception by the intermediate device of the same/identified broadcast content as received by the radio is only set up when then handover takes place, e.g. upon determining that the smartphone is moved away from the car radio.

The radio broadcast reception by the intermediate device is indicated by arrows 308 and 302.

B: User Leaves Car with Intermediate Device; Listening Interrupted

When the intermediate device 13 detects 303 that the play out of the broadcast by the car radio is interrupted it stores 304 the broadcast audio content it receives via its own receiver arrangement in a local memory or 'buffer' of type FIFO (First In, First Out).

According to a particular embodiment, this memory is part of the work memory of the intermediate device. According to a variant embodiment, the memory is a dedicated memory or memory zone for hosting a timeshift buffer.

According to a particular embodiment, the interruption is detected through a significant, e.g. below a predetermined threshold, drop in level of a physical parameter generated by the radio, such as the audio level, measured with a microphone in the intermediate device, or the reception level of a wireless connection between the intermediate device and the car radio measured by the intermediate device, such as the previously mentioned Bluetooth, WiFi or NFC.

According to a particular embodiment, the intermediate device 'tunes' to the radio station received by the car radio as soon as it has identified the radio station. According to a variant embodiment, the intermediate device only 'tunes' to the identified radio station upon the detection of the interruption. The latter variant embodiment advantageously allows limiting battery usage.

C: User Continues Seamless Listening to Interrupted Broadcast Radio

When the user leaves his/her car and enters home, the intermediate device detects 305 the presence of a communication network such as a WiFi home network. The intermediate device automatically connects 306 to the home network and starts 307 timeshifted streaming of the broadcasted audio content to a device in the home network, so that the user seamlessly continues to listen to the radio station via the home network device.

Timeshifted streaming means that the smartphone streams the received broadcast content to the destination home network device from its local memory while continuing to receive the broadcast radio station and storing the received broadcast radio station in the local memory; the received broadcast content is thus delayed or timeshifted with a lag that corresponds to the time needed for the handover, i.e. the time elapsed between the detection of the moving away 303 until the starting of streaming to the destination home network device 307. This way, a seamless handover is established, i.e. no information is lost for the user/listener, the radio program continues to be played out on the destination device from the moment where it was interrupted.

The size of the local memory used for the timeshifted streaming depends on the bit rate of the broadcast content received and of the time needed for the handover. The local memory should thus have a sufficient maximum size; e.g.:

for a five-minute handover of content with a bit rate of 256 kbits/s (e.g. audio content), the required local memory size for timeshifted streaming would be 5*60*256 kbits=9600 kbyte.

for a five-minute handover of content with a bit rate of 3 Mbit/s (e.g. video content), the required size of a local memory for timeshifted streaming would be about 112 Mbyte, which figures are largely within the storage capacities of intermediate devices such as smartphones.

According to a particular embodiment, if the home network comprises multiple devices capable of receiving the audio/video content stream from the intermediate device and render the audio/video comprised in the audio/video content stream, a user preferred device is chosen, e.g. the digital television in the living room, the desktop PC in the study, or the Internet radio in the kitchen.

According to a variant embodiment, a capable rendering device is chosen that is at shortest distance from the intermediate device, this distance being for example determined via:

GPS (Global Positioning System);

WPS (WiFi based Positioning System; also referred to as WiPS/WFPS; used where GPS is inadequate due to multipath and indoor signal blockage);

Bluetooth signal strength, NFC signal strength or WiFi signal strength.

According to a particular embodiment, audio/video content streaming from the intermediate device's timeshift memory to the chosen second/destination device is direct, that is via a direct connection between the smartphone and a second/destination device; e.g. via WiFi, Bluetooth or NFC. This is possible if the second/destination device is equipped with a WiFi, Bluetooth or NFC interface. In this case, a home network is not required.

According to a variant embodiment, streaming is indirect e.g. via WiFi from the intermediate device to the home gateway which then forwards the stream to the destination device in the home network via wired Ethernet.

Thus, advantageously, the play out handover method according to the present principles allows seamless broadcast reception handover from a first/source device (e.g. the car radio) to a second/destination device (e.g. the home network device) via an intermediate device (e.g. the smartphone).

According to the present principles, a user can interrupt his/her listening to a first/source device and then automatically resume listening from the point of interruption on a second device.

Advantageously, the handover according to the present principles is autonomous, i.e. it does not require distant storage servers for recording of broadcast content, thereby procuring the advantage to be easily scalable from one to ten, hundreds, thousands or millions of users as the handover is managed locally between local devices and does not require connection to distant content servers for recording of content in a provider network.

The broadcast content is thus streamed from the intermediate device to the second/destination device.

When the intermediate device moves away from the second/destination device (the moving away can be determined by any of the previously described methods for detection of the moving away), the streaming of the intermediate device to the second/destination device is interrupted, which has the effect of increasing the size of the timeshift memory. When the intermediate device returns to within proximity of the second/destination device (the proximity can be determined according to similar principles as the moving away), a handover to the second/destination device is carried out according to the previously described principles, i.e. timeshifted streaming from the intermediate device to the second/destination device is resumed and rendering of the timeshifted streaming from the intermediate device on the second/destination device resumes.

The handover can also be done to another second/destination device; for example, the intermediate device moves away from the second/destination device (e.g. digital television) in the living room to enter the kitchen and to approach another second/destination device present there (e.g. the kitchen TV).

The present principles are applicable to many scenarios, such as the intermediate device moving from a home into a car, in which a handover is carried out from a home device to a car radio, or the intermediate device being moved from one home to another, in which the handover is carried out from one home device in one home to another home device in another home.

Determining a Presence of a Second/Destination Device

The presence of a second/destination device can be determined in different ways.

According to a particular embodiment, the presence of a second/destination device is determined based on a distance detection. The presence of the second/destination device is detected when the distance between the intermediate device and the second/destination device is below a determined threshold, e.g. the threshold being 1 centimeter (cm), 10 cm, 1 meter (m), 3 m, 10 m or any value in between. This distance detection can be done for example based on a detection of a near field communication (NFC) e.g., the intermediate device is approached to an NFC tag present on the second/destination device, or based on detection of an RF field, e.g. caused by a wireless communication network (e.g. WiFi, Bluetooth). Advantageously the field strength of the RF signal that is above a determined threshold for the presence to be determined in order to ensure correct communication with the second/destination device. Alternatively, the distance detection is based on location of the intermediate device with regard to the location of the second/destination device that is obtained from a locating means such as GPS or WiFi based positioning.

According to a variant embodiment, the presence of a second/destination device is determined based on a physical detection by the intermediate device of a presence of the second/destination device. This physical detection of presence of the second/destination device can be detected by a camera in the intermediate device that is capable of capturing an image of the second/destination device. If the image corresponds to a stored image or image fingerprint of an identified second/destination device, the presence of the second/destination device is detected. Communication with the second/destination device for handover according to the present principles can then be established using known communication methods e.g. WiFi, WiMAX or Bluetooth.

The physical presence of a second/destination device can also be determined by using a pointing arrangement in the intermediate device to point to a second/destination device. The pointing arrangement is for example based on a light emitter and receiver, possibly combined with a camera to determine the second/destination device that is pointed to. If the image of the pointed-to second/destination device corresponds to a stored image or image fingerprint of an identified second device, the presence of the second device is detected. Communication with the second/destination device for handover according to the present principles can then be established using known communication methods as described above. Alternatively, the pointing device is based on movement detection e.g. using an accelerometer or gyroscopic device or based on a motion sensing input device such as Microsoft® Kinect™.

According to a variant embodiment, the presence of a second/destination device is detected using a QR (Quick Response) or Bar code reader; e.g. the second/destination device showing a QR or bar code, which can be read with a QR or Bar code reader in the intermediate device. Once the second/destination device has been identified through the QR or Bar code reader, communication can be established using known communication methods as described above, for handover according to the present principles.

The above described variants can be combined to form a particular powerful variant embodiment that improves the probability that the determined second/destination device is the second/destination device that the user of the intermediate device wants to be used for the handover according to the present principles. E.g. in a home network, when presence of multiple second/destination devices is determined based on detection of a wireless communication network such as WiFi (e.g., a second/destination device in the living room, and another in the kitchen), the above described physical detection and/or distance detection and/or pointing detection can be used to choose between the multiple devices; e.g. the second/destination device that is physically detected by the intermediate device and/or that is at shortest distance from the intermediate device and/or that is detected as being pointed to is selected as the second/destination device for the handover according to the present principles. Also, if a choice is to be made between multiple second/destination devices, user preferences stored in the intermediate device or in the home network can be used for choosing a preferred second/destination device, and/or second/destination device capabilities can be used for choosing a second/destination device, such as a HD (High Definition) capable video rendering device instead of an SD (Standard Definition) only capable video device when handing over HD video content according to the present principles.

Figure 4:
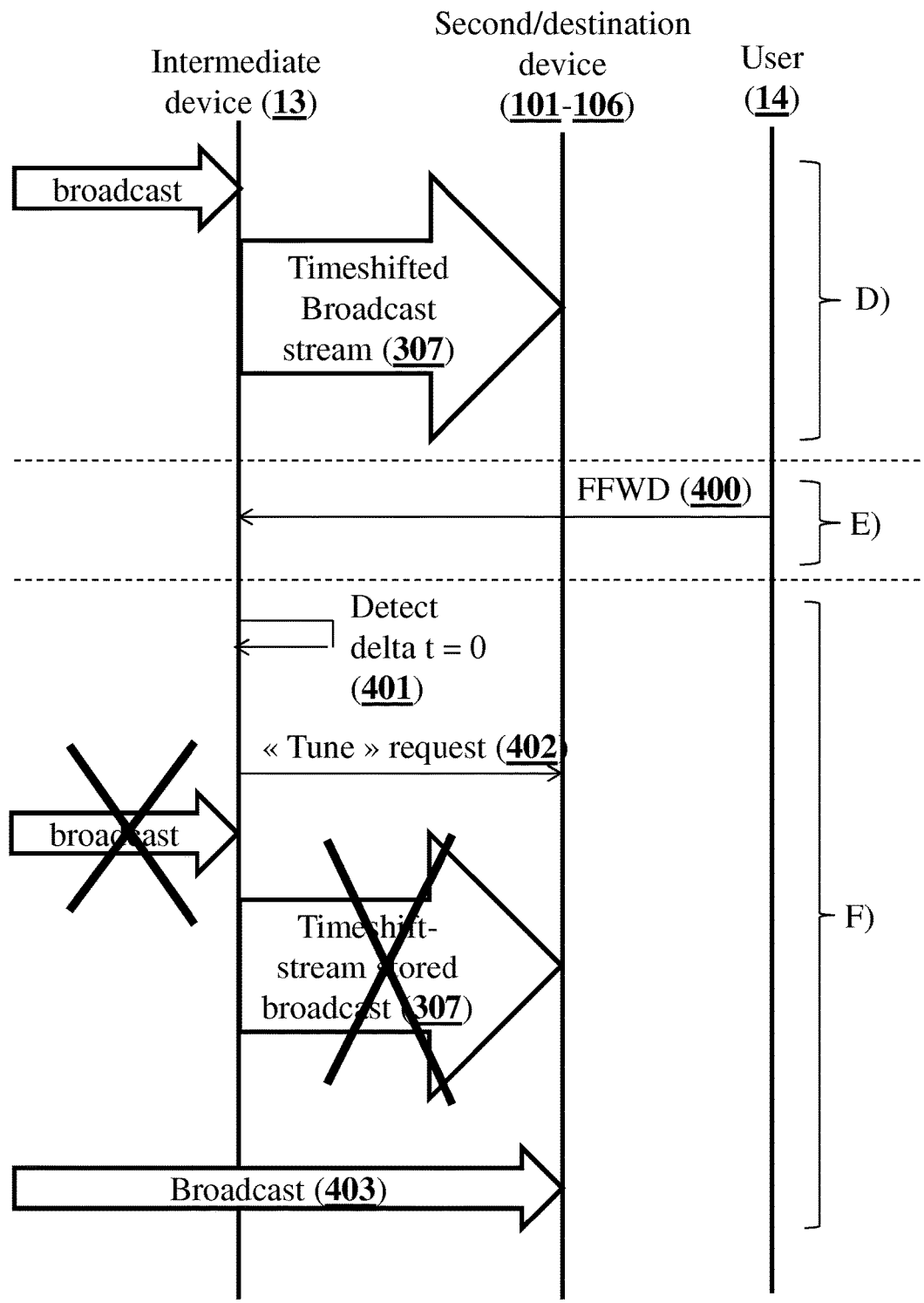
FIG. 4 is a sequence chart of an example embodiment illustrating further aspects of the present principles.

FIG. 4 is a sequence chart of an example embodiment illustrating further aspects of the present principles. According to the scenario illustrated here:

D) the intermediate device 13 receives a broadcast audio/video content which it timeshifts and forwards 307 to one of the home network devices.

E) the user wearing/holding the intermediate device 13 initiates a trick mode operation such as fast forward action 400 on the audio/video broadcast content received by the intermediate device 13. This has the effect of moving a read pointer in the timeshift memory of the intermediate device 13 towards the direction of the start of the timeshift memory, and has the further effect of shrinking the timeshift memory size. If the fast forward action is maintained, the read pointer in the timeshift memory will move towards the start of the timeshift memory; in other words, timeshift memory size and the timeshift delay are, in fine, reduced to zero.

F) When it is determined 401 that the timeshift delay is dropped below a determined threshold, a request 402 is transmitted by the intermediate device 13 to the second/destination device 101-106 to switch to reception of the audio/video broadcast content, or in other words, to reception of the audio/video broadcast content by a receiver means (e.g. RF tuner, Internet) comprised in the second/destination device 101-106 or associated with the second/destination device 101-106. When the second/destination device 101-106 has set up the reception of the broadcast audio/video content 403, the intermediate device 13 stops transmitting the received broadcast audio/video content to the second/destination device and disconnects from the broadcast reception, i.e. it frees its resources used for the forwarding.

Figure 5:
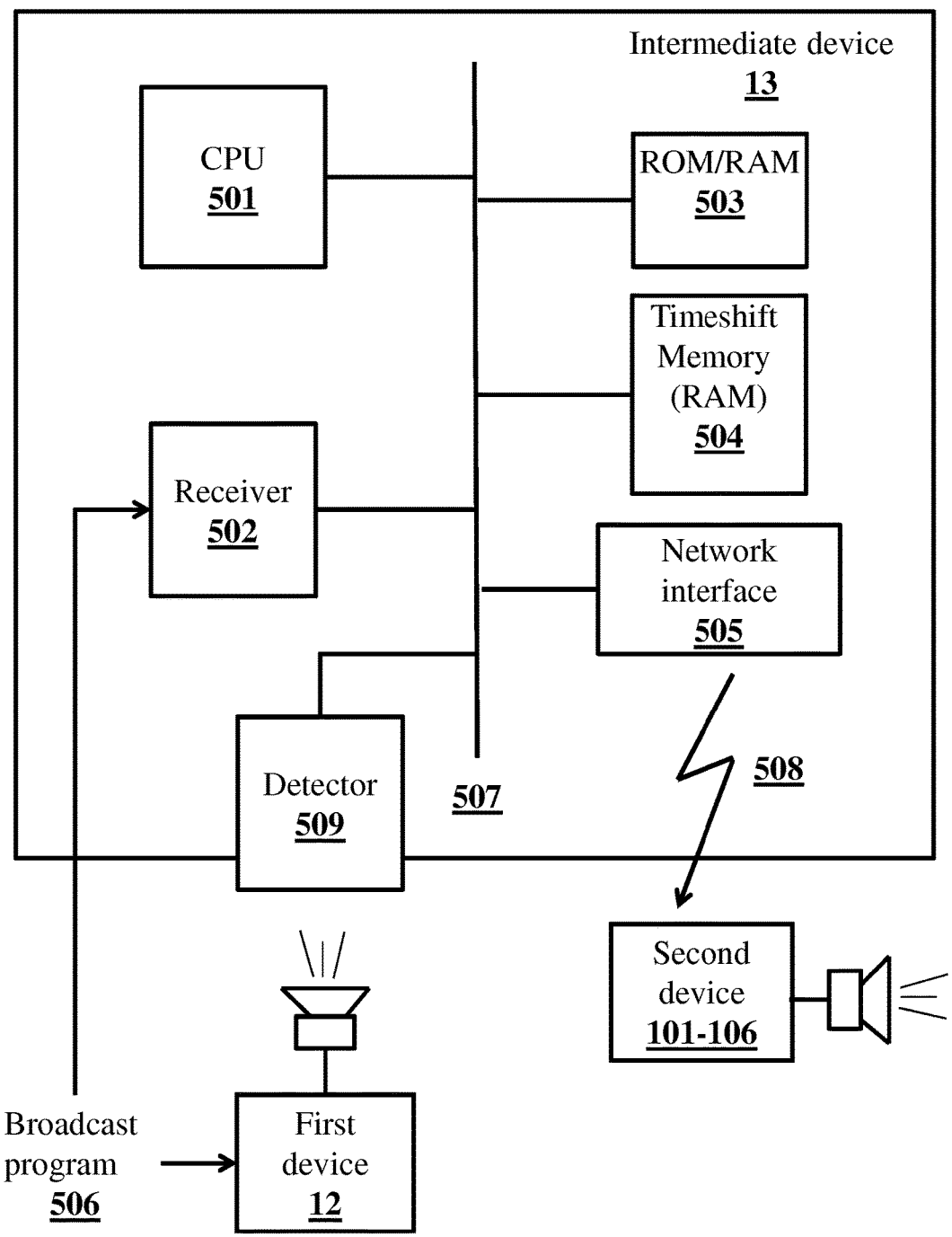
FIG. 5 is an example embodiment of an intermediate device according to the present principles.

FIG. 5 is an example embodiment of an intermediate device according to the present principles. The intermediate device 13 comprises the following elements, interconnected by means of a communication bus 507: a CPU (Central Processing Unit, processor, processing device or processing unit) 501, a timeshift memory 504, broadcast receiver 502, a network interface 505 and a ROM/RAM (Read Only/Random Access) memory 503 and a detector 509. The figure further comprises a first/source device 12, a second/destination device 101-106 being capable of communicating (arrow 508) with the network interface 505 and a broadcast program 506. The network interface is for example according to Bluetooth, Wifi or NFC. The broadcast receiver 502 is for example an RF (radio frequency) receiver or Internet receiver or a mobile data receiver such as 3G, 4G or LTE.

According to a variant embodiment, the network interface 505 comprises an NFC receiver/transmitter or a WiFi receiver/transmitter.

According to a variant embodiment, the sensor 509 is a camera and/or microphone, or a second network interface.

In the diagram, arrows that provide the audio/video broadcast content are illustrated as coming from a same source. This representation is not mentioned as limiting the audio/video broadcast content to a single source.

Each of the devices 12 and 13 can receive a same audio/video broadcast program from a same, or from a different source; for example, while the first/source device 12 comprises an RF receiver that receives the audio/video broadcast content from an RF transmitter, the intermediate device 13 is a smartphone that receives the same broadcast program from an Internet radio via a mobile Internet service over 3G/4G/LTE.

The reader of the present document will readily understand that if device 13 is a smartphone other components not shown such as input/output means will be present in the device such as a display and/or keyboard.

The processor 501 operably communicates with the other elements of the device to fulfill required functions.

The ROM/RAM 503 memory comprises computer readable instructions that are executed by the processing device 501.

The timeshift memory 504 or 'timeshift buffer' is used to temporarily store the received audio/video broadcast content stream 506. This timeshift memory is either a separate memory as shown in the figure or a memory that is integrated in to the ROM/RAM memory 503.

The broadcast receiver 502 or receiver arrangement allows the device 13 to receive an audio/video broadcast content, and in particularly to receive a same audio/video broadcast content as is received by a first/source device 12.

The detector 509 allows to detect an interruption of play out by the first/source device 12 and further allows to determine that the intermediate device 13 is near to a second/destination device 101-106, according to the principles that have previously been explained.

The network interface 505 is further configured to connect to a second/destination device 101-106 if a presence of a second/destination device 101-106 is determined, and is further configured for timeshifted streaming of audio/video broadcast content from the timeshift memory 504 to a second/destination device 101-106.

According to a variant embodiment, the intermediate device 13 detects an interruption of play out by the first device 12 because audio volume measured by the detector 509 decreases below a threshold. This can be caused by the intermediate device 13 being moved away from the first/source device 12 or the first/source device 12 being switched off.

According to a variant embodiment, the intermediate device 13 comprises different types of network interfaces: e.g. a Bluetooth interface for connection to the first/source device 12, and a WiFi interface for connection to the second/destination device 101-106.

According to a variant embodiment, the network interface 505 is further operably configured to transmit a request to the at least a second device 101-106 to switch to live reception by the second device 101-106 of the audio/video broadcast content, the second device 101-106 having a receiver arrangement for receiving the audio/video broadcast content, when a timeshift delay of the timeshift streaming of the audio/video broadcast content is/drops below a threshold. This threshold is for example zero seconds, 10 seconds, or one minute. The lower the threshold is set, the smoother the handover will be for the user. The threshold can be set to zero seconds for a seamless handover over the audio/video broadcast content play out from the first/source device 12 to the second/destination device 101-106. Once the intermediate device receives a confirmation from the second/destination device 101-106 that the second/destination device 101-106 has switched to reception of the audio/video broadcast content using its own reception means, the intermediate device 13 can free the resources used for reception and storing of the audio/video broadcast stream, e.g. receiver 502 and timeshift memory 504. These resources can then be reused for other purposes. According to a particular embodiment, the confirmation is a message from the second/destination device 101-106 received by the intermediate device via the network interface 505.

According to a variant embodiment, the detector 509 is configured to measure a reception level of at least one physical parameter (e.g. sound level, light intensity, intensity of radio wave reception) generated by the first/source device 12, so that the interruption of the play out by the first/source device 12 of the audio/video broadcast content received by the first/source device 12 can be detected therefrom.

Figure 6:
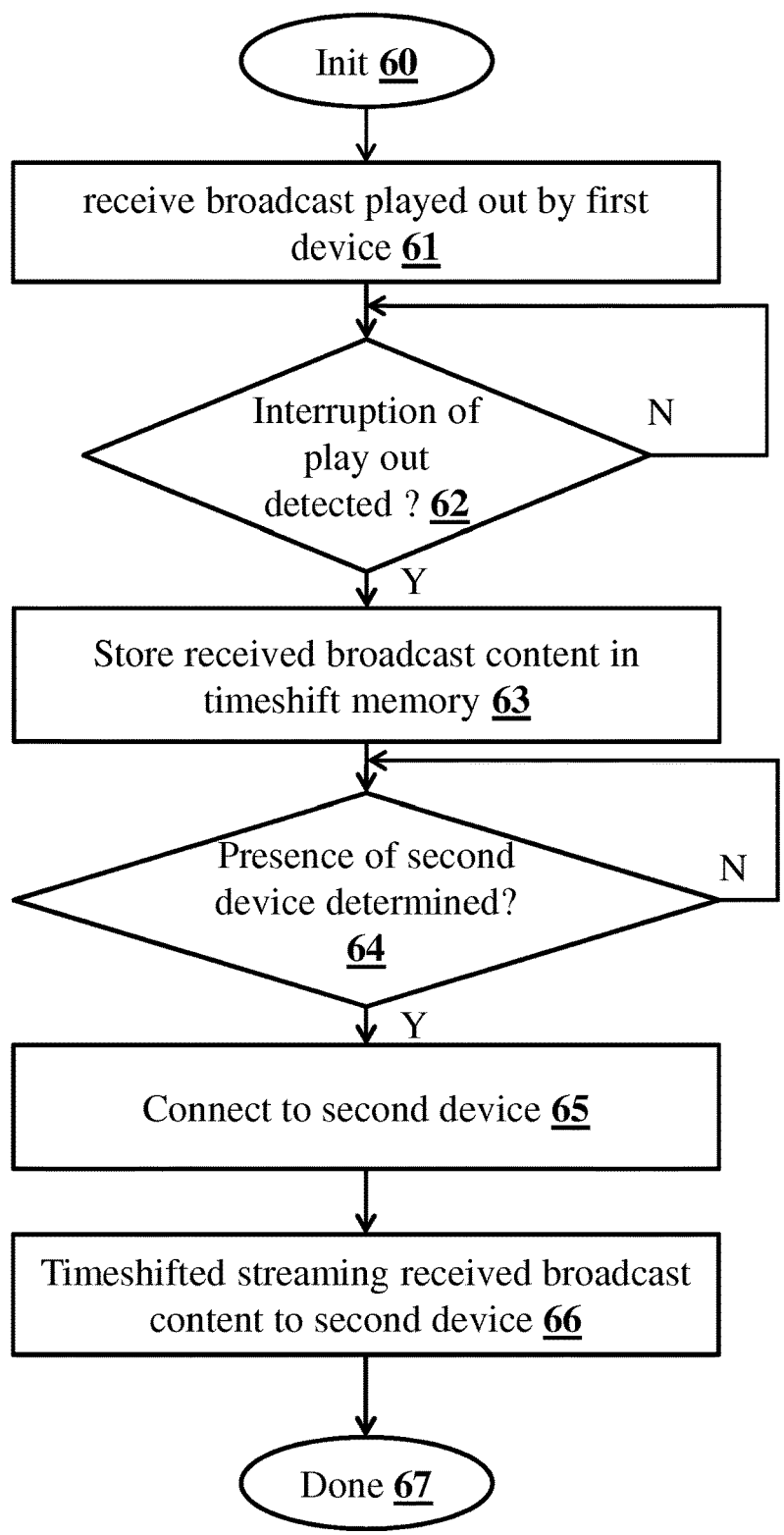
FIG. 6 is a flow chart of an advantageous embodiment of a method according to the present principles.

FIG. 6 is a flow chart of an advantageous embodiment of a method of play out handover of audio/video broadcast content between a first/source device (e.g. 12) and a second/destination device (e.g. 101-106) according to the present principles, implemented for example by intermediate device 13 of FIG. 5. In a step 60, different variables and memory zones that are used in the method are initialized. In a step 61, a receiver 502 of the intermediate device 13 is set up to receive the same audio/video broadcast as is received by the first/source device 12. In a step 62, the intermediate device 13 detects an interruption of play out by the first/source device of the audio/video broadcast content. In a step 63, if the interruption was detected in step 62, the audio/video broadcast content received by the intermediate device 13 is stored in timeshift memory 504 of intermediate device 13. In a step 64, it is determined using network interface 505 if a presence of a second/destination device 101-106 is detected. Operation 64 is continued until a presence of a second/destination device 101-106 is determined. If such presence is determined, the intermediate device connects via the network interface 505 and in a step 65, to said second/destination device 101-106, and the intermediate device 13 timeshifted streams in a step 66 the audio/video broadcast content as received by said receiver 502 in said intermediate device 13 to said second/destination device 101-106 from the timeshift memory 504. Then the method is done 67.

As will be appreciated by the skilled in the art, the present principles are equally applicable to audio, video, or video with audio.

Some elements in the drawings may not be used or be necessary in all embodiments. Some operations may be executed in parallel.

As will be appreciated by one skilled in the art, aspects of the present principles can be embodied as a system, method or computer readable medium. Accordingly, aspects of the present principles can take the form of an entirely hardware embodiment, an entirely software embodiment (including firmware, resident software, micro-code and so forth), or an embodiment combining hardware and software aspects that can all generally be defined to herein as a "circuit", "module" or "system". Furthermore, aspects of the present principles can take the form of a computer readable storage medium. Any combination of one or more computer readable storage medium(s) can be utilized.

Thus, for example, it will be appreciated by those skilled in the art that the diagrams presented herein represent conceptual views of illustrative system components and/or circuitry embodying the principles of the present disclosure. Similarly, it will be appreciated that any flow charts, flow diagrams, state transition diagrams, pseudo code, and the like represent various processes which may be substantially represented in computer readable storage media and so executed by a computer or processor, whether or not such computer or processor is explicitly shown.

A computer readable storage medium can take the form of a computer readable program product embodied in one or more computer readable medium(s) and having computer readable program code embodied thereon that is executable by a computer. A computer readable storage medium as used herein is considered a non-transitory storage medium given the inherent capability to store the information therein as well as the inherent capability to provide retrieval of the information there from. A computer readable storage medium can be, for example, but is not limited to, an electronic, magnetic, optical, electromagnetic, infrared, or semiconductor system, apparatus, or device, or any suitable combination of the foregoing. It is to be appreciated that the following, while providing more specific examples of computer readable storage mediums to which the present principles can be applied, is merely an illustrative and not exhaustive listing as is readily appreciated by one of ordinary skill in the art: a portable computer diskette; a hard disk; a read-only memory (ROM); an erasable programmable read-only memory (EPROM or Flash memory); a portable compact disc read-only memory (CD-ROM); an optical storage device; a magnetic storage device; or any suitable combination of the foregoing.

The invention claimed is:

1. A method of seamless play out handover from a first device to a second device of an audio/video broadcast, said method being implemented by an intermediate mobile communication device, referred to as third device, said method comprising:

setting up, by said third device, a reception by an audio/video broadcast receiver arrangement in said third device of said audio/video broadcast as also received and played out by said first device;

detecting, by said third device, an interruption of play out by said first device of said audio/video broadcast;

storing, after said detecting, in a timeshift memory in said third device said audio/video broadcast received by said audio/video broadcast receiver arrangement in said third device;

connecting said third device to said second device in response to a presence of said second device is detected by said third device, and timeshifted streaming by said third device of said audio/video broadcast received by said audio/video broadcast receiver arrangement in said third device to said second device from said timeshift memory in said third device for seamless play out handover by the third device of said audio/video broadcast from said first device to said second device.

2. The method according to claim 1, further comprising, when a timeshift delay of said timeshifted streaming by said intermediate mobile communication device of said audio/video broadcast from said timeshift memory in said intermediate mobile communication device is below a threshold:

transmitting, by said intermediate mobile communication device, a request to said second device to switch to reception by said second device of said audio/video broadcast through a receiver arrangement for receiving said audio/video broadcast comprised into said second device or associated with said second device; and freeing by said intermediate device of resources of said intermediate mobile communication device used for reception and storing of said audio/video broadcast when a confirmation is received by said intermediate mobile communication device from said second device that said second device has switched to reception of said audio/video broadcast through said receiver arrangement in said second device;

said timeshift delay corresponding to time elapsed between said detecting and starting of said timeshifted streaming.

3. The method according to claim 1, wherein said detecting said interruption of play out is based on a measurement by said intermediate mobile communication device of a level of at least one physical parameter generated by said first device dropping below a threshold.

4. The method according to claim 3, wherein said at least one physical parameter generated by said first device is a signal level of a radio frequency signal generated by said first device.

5. The method according to claim 3, wherein said at least one physical parameter generated by said first device is an audio level of play out by said first device of said audio/video broadcast.

6. The method according to claim 1, wherein said presence of said second device is detected based on a distance detection by said intermediate mobile communication device, said presence of said second device being detected by said mobile communication device when a distance between said intermediate mobile communication device and said second device is below a threshold.

7. The method according to claim 1, wherein said presence of said second device is detected by said intermediate mobile communication device through Near Field Communication.

8. The method according to claim 1, wherein said presence of said second device is detected by said intermediate mobile communication device based on a detection by said intermediate mobile communication device of a wireless digital communication network comprising said second device.

9. The method according to claim 1, wherein said presence of said second device is detected based on a physical detection by said intermediate mobile communication device of a presence of said second device.

10. The method according to claim 9 wherein said physical detection comprises use of a camera in said intermediate mobile communication device to capture an image of said second device.

11. The method according to claim 9 wherein said physical detection comprises use of a pointing arrangement in said intermediate mobile communication device to determine a pointing of said intermediate mobile communication device to said second device.

12. A mobile communication device for seamless play out handover by the mobile communication device from a first device to a second device of an audio/video broadcast, the mobile communication device, referred to as third device, comprising:
an audio/video broadcast receiver in said third device configured to receive said audio/video broadcast as also received and played out by said first device;
a detector in said third device configured to detect an interruption of play out by said first device of said audio/video broadcast;
a timeshift memory in said third device, configured to store in said third device said audio/video broadcast received by said audio/video broadcast receiver in said third device upon said detection by said third device; and
a network interface in said third device configured to connect said third device to said second device in response to a presence of said second device is detected and a processor configured for timeshifted streaming by said third device of said audio/video broadcast received by said audio/video broadcast receiver in said third device to said second device from said timeshift memory in said third device for seamless play out handover by said third device of said audio/video broadcast from said first device to said second device.

13. The mobile communication device according to claim 12, wherein:
said network interface in said mobile communication device is further configured to transmit a request to said second device to switch to reception by said second device of said audio/video broadcast through a receiver arrangement for receiving said audio/video broadcast comprised in said second device or associated with said second device, when a timeshift delay of said time-shifted streaming by said mobile communication device of said audio/video broadcast to said second device is below a threshold; and
said processor in said mobile communication device is further configured to free said audio/video broadcast receiver in said mobile communication device and said timeshift memory in said mobile communication device when a confirmation is received by said mobile communication device from said second device that said second device has switched to reception of said audio/video broadcast through said receiver arrangement in said second device;
said timeshift delay corresponding to time elapsed between said detecting and starting of said timeshifted streaming.

14. The mobile communication device according to claim 12, wherein said detector in said mobile communication device is further configured to detect an interruption of play out by the first device by measuring a level of at least one physical parameter generated by said first device.

15. The mobile communication device according to claim 14, wherein said detector in said mobile communication device is further configured to detect an interruption of play out by the first device by measuring a signal level of a radio frequency signal generated by said first device.

* * * * *